(12) United States Patent
Zhao et al.

(10) Patent No.: US 9,279,190 B2
(45) Date of Patent: Mar. 8, 2016

(54) METHOD FOR PREPARING DIAMOND CARBON MEMBRANE ON SURFACE OF STAINLESS STEEL

(71) Applicants: Shanghai Jiao Tong University, Shanghai (CN); Shanghai Switchdiy Digital Technology Co., Ltd., Shanghai (CN)

(72) Inventors: Binyuan Zhao, Shanghai (CN); Binhui Luo, Shanghai (CN); Qian Mei, Shanghai (CN); Yijian Lai, Shanghai (CN); Yuesheng Ning, Shanghai (CN); Lei Wang, Shanghai (CN); Jie Zhou, Shanghai (CN)

(73) Assignees: SHANGHAI JIAO TONG UNIVERSITY, Minhang District, Shanghai (CN); SHANGHAI SWITCHDIY DIGITAL TECHNOLOGY CO., LTD., Songjiang District, Shanghai (CN)

( * ) Notice: Subject to any disclaimer, the term of this patent is extended or adjusted under 35 U.S.C. 154(b) by 190 days.

(21) Appl. No.: 14/078,391

(22) Filed: Nov. 12, 2013

(65) Prior Publication Data

US 2015/0132502 A1   May 14, 2015

(51) Int. Cl.
| | | |
|---|---|---|
| *C04B 41/00* | (2006.01) | |
| *B05D 3/00* | (2006.01) | |
| *B29C 71/02* | (2006.01) | |
| *C25F 1/00* | (2006.01) | |
| *C30B 1/00* | (2006.01) | |

(52) U.S. Cl.
CPC .... *C25F 1/00* (2013.01); *C30B 1/00* (2013.01)

(58) Field of Classification Search
CPC .... B05D 3/0209; B05D 3/102; B05D 3/0254; B05D 7/14; C23C 26/00; C30B 1/02; C30B 1/023
See application file for complete search history.

(56) References Cited

U.S. PATENT DOCUMENTS 5,273,788 A  *  12/1993 Yu ................................ 427/554

* cited by examiner

*Primary Examiner* — Michael Wieczorek
(74) *Attorney, Agent, or Firm* — Global IP Services; Tianhua Gu

(57) ABSTRACT

The present invention relates to a method for preparing a diamond carbon membrane on a surface of stainless steel, including: immersing the pretreated stainless steel into a solution of a biomass-derived carbonaceous mesophase in ethanol for several minutes, prior to taking out and air drying; or alternatively, spraying the solution of the biomass-derived carbonaceous mesophase in ethanol onto the stainless steel surface, to provide a layer of the biomass-derived carbonaceous mesophase film adhered on the stainless steel surface upon full volatilization of the solution on the surface; and then carrying out thermal treatment under a hydrogen atmosphere, to prepare the diamond carbon membrane on the stainless steel surface. By the preparation process, which is convenient and easy in operation, and low in cost, the diamond carbon membrane can be made on the stainless steel substrate in a complicated shape, which has a high level of diamond phase and is uniform, dense, and firm in bonding with the stainless steel substrate, leading to improvement of corrosion resistance, wearability, rigidity and high temperature resistance of the stainless steel, and being worth expanding in practical application.

8 Claims, 1 Drawing Sheet

METHOD FOR PREPARING DIAMOND CARBON MEMBRANE ON SURFACE OF STAINLESS STEEL

BACKGROUND OF THE PRESENT INVENTION

1. Field of Invention

The present invention relates to the field of modification treatment of a metallic or nonmetallic surface, and in particular, to a method for preparing a diamond carbon membrane on a surface of stainless steel.

2. Description of Related Arts

A diamond film, which has such advantages as high hardness, resistance to wear, resistance to corrosion and high temperature resistance, may be applied onto a tool or drill, not only resulting in extension of the tool life by ten times to dozens of times, but also significant improvement of the cutting efficiency. In the conventional method for preparation of diamond, such stringent conditions as high pressure and high temperature are required. Since 1980s, the methods for preparing the diamond film at the moderate conditions of low temperature (600-1000° C.) and low pressure (vacuum or atmospheric pressure) have been developed. The current methods for synthesizing the diamond film primarily include chemical vapor deposition, physical vapor deposition, liquid deposition, polymer pyrolysis and the like. The vapor deposition suffers from such major disadvantages as low growth efficiency, complex deposition apparatus, and high cost, being unsuitable for preparation of diamond film on the substrate with a large area and a complex shape. The liquid deposition suffers from such disadvantages as low rate and efficiency of deposition, and low level of the formed diamond structure phase.

By searching the prior art, liquid electrodeposition of diamond-like film on the stainless steel is found in Electrochemistry, vol. 13, No. 1, pp. 58-62, February 2007, which suggested that, the methanol organic liquid is used as a carbon source by pulse electrochemical deposition to prepare the diamond-like film on the stainless steel surface, having poor crystallinity although there is a characteristic peak like diamond in its Raman spectrum. By searching, the study on the surface of diamond-like film prepared from polymer pyrolysis is found in J. Chin. Electr. Microsc. Soc. 22 (6): 547-548, 2003, which suggested that polyphenyl carbonate dissolved in the organic solvent is applied onto the surface of monocrystalline silicon and is treated at high temperature under inert gas protection upon volatilization of the solvent, to give the diamond-like film primarily including amorphous graphite carbon and possibly trace but undetectable diamond phase.

Preparation of diamond or diamond-like film on the stainless steel surface by polymer pyrolysis has not been reported. In the patent publication No. U.S. Pat. No. 1,421,477A, the prepared carbonaceous mesophase had optical anisotropy, favorable self-sintering and self-bonding properties. In particular, the biomass-derived carbonaceous mesophase film may be converted into the diamond or diamond-like film under hydrogen selective etching, induction and catalytic action during heating. The stainless steel, specially the most widely used stainless steel 304 and 316, contains substantial elements such as iron, nickel and chromium, resulting in a certain catalytic effect on synthesis of the diamond carbon membrane.

SUMMARY OF THE PRESENT INVENTION

To overcome the disadvantages in the prior art, the present invention aims to provide a method for preparing a diamond carbon membrane on a surface of stainless steel. For pyrolysis and conversion of the biomass-derived carbonaceous mesophase into carbon film according to the present invention, a variety of metal components such as Fe, Cr, Ni, and Mn, have an inducing catalytic effect on conversion of carbon film, hydrogen atmosphere and a given temperature lead to selectivity of the pyrolyzed carbon, and the mesophase layered structure favors the effect of hydrogen and catalyst, resulting in formation of carbon film containing diamond component.

The objective of the present invention is realized by:

A method for preparing the diamond carbon membrane on the stainless steel surface, including:

(1) pretreatment of the surface of the stainless steel: the stainless steel surface is required to be subject to polishing, acid washing or electrochemical treatment for removal of oxide, grease stain, and grain impurities on the surface;

(2) adhesion of a biomass-derived carbonaceous mesophase film on the stainless steel surface: the pretreated stainless steel sample is immersed into a solution of the biomass-derived carbonaceous mesophase in ethanol with a given concentration for 5 minutes prior to taking out and air drying; or alternatively, the solution of the biomass-derived carbonaceous mesophase in ethanol with a given concentration is sprayed onto the stainless steel surface, to provide a layer of biomass-derived carbonaceous mesophase film adhered on the stainless steel surface upon full volatilization of the solution on the surface;

(3) thermal treatment: the stainless steel having the biomass-derived carbonaceous mesophase film adhered is subject to thermal treatment under hydrogen-contained atmosphere, to prepare the diamond carbon membrane on the stainless steel surface.

The stainless steel is one of various types, including stainless steel 201, stainless steel 202, stainless steel 304, stainless steel 316, stainless steel 410 or stainless steel 420.

The solution of the biomass-derived carbonaceous mesophase in ethanol is one formulated from the biomass-derived carbonaceous mesophase by dissolution into absolute ethanol, where the biomass-derived carbonaceous mesophase is prepared according to the patent No. CN1421477A.

The solution of the biomass-derived carbonaceous mesophase in ethanol has the concentration of 0.0001-1 wt %.

Full impregnation of the stainless steel by the solution is required upon immersion of the stainless steel in the solution of the biomass-derived carbonaceous mesophase in ethanol or spraying of the solution of the biomass-derived carbonaceous mesophase in ethanol onto the stainless steel surface.

The heat treatment process is divided into three stages: stage 1: heating from room temperature to the predetermined temperature of 800-1200° C. at a heating rate of 5-30° C./min; stage 2: maintaining at the predetermined temperature of 800-1200° C. for 0.5-3 hours; and stage 3: natural cooling with a furnace.

The hydrogen-contained atmosphere is pure hydrogen gas, or mixed gas of hydrogen gas and nitrogen gas or another inert gas.

The another inert gas includes helium or argon gas, where the percent by volume of the hydrogen gas is more than 75%.

Compared to the prior art, the present invention involves using the chemical properties of the biomass-derived carbonaceous mesophase, the catalytic properties of the metal atoms on the stainless steel surface, and selective etching effect of hydrogen gas for pyrolysis of the biomass-derived carbonaceous mesophase film onto the stainless steel surface to provide a layer of diamond carbon membrane, where the biomass-derived carbonaceous mesophase with widely available source and low cost is used as the raw material; the desired apparatuses are simple without vacuum chamber or high-temperature high-pressure equipment; the preparation process is simple, only including three steps: pretreatment of the stainless steel surface, application of the biomass-derived carbonaceous mesophase film on the stainless steel surface and thermal treatment for preparation of the carbon film with various contents of diamond component; and the generated film is uniform, dense, and firm in bonding with the stainless steel substrate, leading to improvement of corrosion resistance, rigidity and high temperature resistance of the stainless steel, and being worth expanding in practical application.

DETAILED DESCRIPTION OF THE PREFERRED EMBODIMENTS

The present invention will be described in detail with reference to the accompanying drawings and specific embodiments. These embodiments are implemented following the solution of the present invention, presenting the detailed implementation and specific working process, but the scope of the present invention is not limited by the following embodiments.

Embodiment 1

Figure 1:
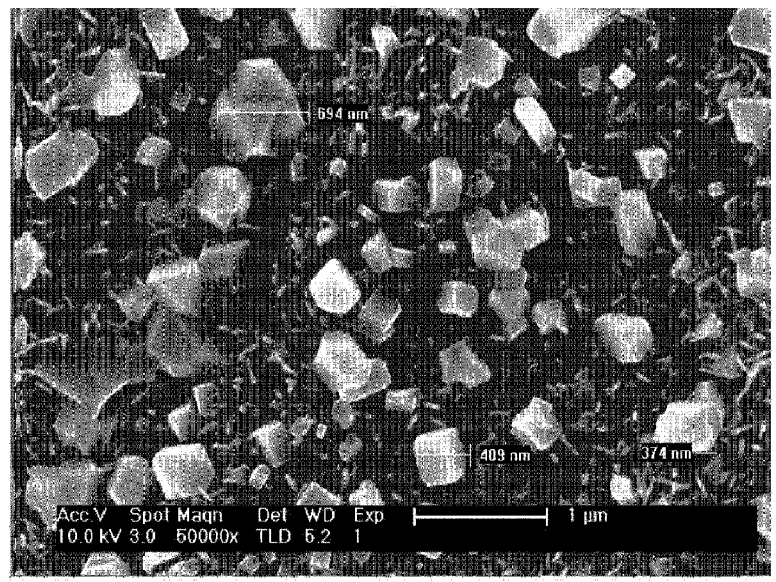
FIG. 1 is a scanning electron microphotograph of the carbon film on the stainless steel surface prepared in Embodiment 1.
Figure 2:
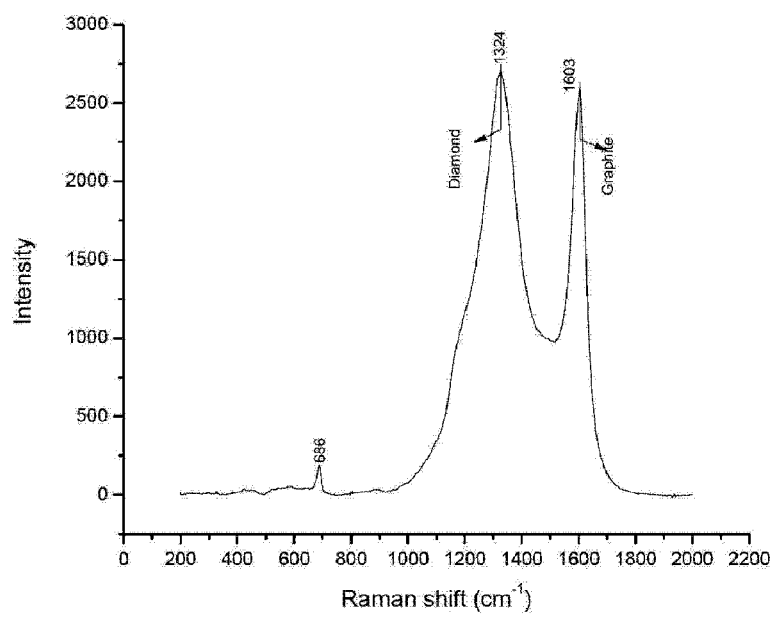
FIG. 2 is a Raman spectrum of the carbon film on the stainless steel surface prepared in Embodiment 1.

A piece of stainless steel 304 product is subject to acid washing, polishing and rinsing, for removal of oxide and impurities on the surface; the solution of the biomass-derived carbonaceous mesophase (0.01 wt % content) in ethanol is sprayed onto the overall surface of the stainless steel for air drying, heated up to 800° C. at a rate of 5° C./min under pure hydrogen atmosphere and maintained at this temperature for 30 min, prior to cooling with the furnace, to prepare the diamond carbon membrane on the surface of the stainless steel 304. In a scanning electron microphotograph as shown in FIG. 1, the bulk granular material is diamond, and the fine tubular material is nano-graphite. In Raman spectrum as shown in FIG. 2, there is a peak at 1324 cm$^{-1}$ from the diamond phase, and a peak at 1603 cm$^{-1}$ from the nano-graphite.

Embodiment 2

A piece of stainless steel 202 product is subject to acid washing, polishing and rinsing, for removal of oxide and impurities on the surface; the solution of the biomass-derived carbonaceous mesophase (0.5 wt % content) in ethanol is sprayed onto the overall surface of the stainless steel for air drying, heated up to 1000° C. at a rate of 10° C./min under pure hydrogen atmosphere and maintained at this temperature for 2 hours, prior to cooling with the furnace, to prepare the diamond carbon membrane on the surface of the stainless steel 202.

Embodiment 3

A piece of stainless steel 316 product is subject to acid washing, polishing and rinsing, for removal of oxide and impurities on the surface; the solution of the biomass-derived carbonaceous mesophase (0.05 wt % content) in ethanol is sprayed onto the overall surface of the stainless steel for air drying, heated up to 1100° C. at a rate of 15° C./min under the mixed gas blanket of hydrogen and nitrogen gas (percent by volume of hydrogen gas: 80%) and maintained at this temperature for 1 hour, prior to cooling with the furnace, to prepare the diamond carbon membrane on the surface of the stainless steel 316.

Embodiment 4

A piece of stainless steel 316 product is subject to acid washing, polishing and rinsing, for removal of oxide and impurities on the surface; the stainless steel 316 product is immersed into the solution of the biomass-derived carbonaceous mesophase (1 wt % content) in ethanol for 5 minutes prior to taking out and air drying; is heated up to 1200° C. at a rate of 15° C./min under the mixed gas blanket of hydrogen and argon gas (percent by volume of hydrogen gas: 80%) and maintained at this temperature for 10 minutes, prior to cooling with the furnace, to prepare the diamond carbon membrane on the surface of the stainless steel 316.

Embodiment 5

A piece of stainless steel 201 product is subject to acid washing, polishing and rinsing, for removal of oxide and impurities on the surface; the stainless steel 201 product is immersed into the solution of the biomass-derived carbonaceous mesophase (0.0001 wt % content) in ethanol for 5 minutes prior to taking out and air drying; is heated up to 1200° C. at a rate of 30° C./min under the mixed gas blanket of hydrogen and argon gas (percent by volume of hydrogen gas: 90%) and maintained at this temperature for 1 hour, prior to cooling with the furnace, to prepare the diamond carbon membrane on the surface of the stainless steel 201.

Embodiment 6

A piece of stainless steel 410 product is subject to acid washing, polishing and rinsing, for removal of oxide and impurities on the surface; the stainless steel 410 product is immersed into the solution of the biomass-derived carbonaceous mesophase (0.1 wt % content) in ethanol for 5 minutes prior to taking out and air drying; is heated up to 1200° C. at a rate of 15° C./min under the mixed gas blanket of hydrogen and helium gas (percent by volume of hydrogen gas: 80%) and maintained at this temperature for 1 hour, prior to cooling with the furnace, to prepare the diamond carbon membrane on the surface of the stainless steel 410.

Embodiment 7

A piece of stainless steel 420 product is subject to acid washing, polishing and rinsing, for removal of oxide and impurities on the surface; the stainless steel 420 product is immersed into the solution of the biomass-derived carbonaceous mesophase (0.1 wt % content) in ethanol for 5 minutes prior to taking out and air drying; is heated up to 1200° C. at a rate of 15° C./min under the mixed gas blanket of hydrogen and argon gas (percent by volume of hydrogen gas: 90%) and maintained at this temperature for 1 hour, prior to cooling with the furnace, to prepare the diamond carbon membrane on the surface of the stainless steel 420.

Embodiment 8

A method for preparing the diamond carbon membrane on the stainless steel surface includes:

(1) pretreatment of the surface of the stainless steel: the surface of the stainless steel 420 is required to be subject to polishing, acid washing or electrochemical treatment for removal of oxide, grease stain, and grain impurities on the surface;

(2) adhesion of the biomass-derived carbonaceous mesophase film on the stainless steel surface: the solution of the biomass-derived carbonaceous mesophase in ethanol with a given concentration is sprayed onto the stainless steel surface, to provide a layer of biomass-derived carbonaceous mesophase film adhered on the stainless steel surface upon full volatilization of the solution on the surface; and (3) thermal treatment: the stainless steel having the biomass-derived carbonaceous mesophase film adhered is subject to thermal treatment under the mixed gas of hydrogen and helium gas with the percent by volume of hydrogen gas being more than 75%, where the heat treatment process is divided into three stages: stage 1: heating from room temperature to the predetermined temperature of 1200° C. at a heating rate of 30° C./min; stage 2: maintaining at the predetermined temperature of 1200° C. for 0.5 hour; and stage 3: natural cooling with the furnace, to prepare the diamond carbon membrane on the stainless steel surface.

Embodiment 9

A method for preparing the diamond carbon membrane on the stainless steel surface includes:

(1) pretreatment of the surface of the stainless steel: the surface of the stainless steel 201 is required to be subject to polishing, acid washing or electrochemical treatment for removal of oxide, grease stain, and grain impurities on the surface;

(2) adhesion of the biomass-derived carbonaceous mesophase film on the stainless steel surface: the pretreated stainless steel sample is immersed into the solution of the biomass-derived carbonaceous mesophase in ethanol with a given concentration for 5 minutes prior to taking out and air drying; and (3) thermal treatment: the stainless steel having the biomass-derived carbonaceous mesophase film adhered is subject to thermal treatment under the hydrogen atmosphere, where the heat treatment process is divided into three stages: stage 1: heating from room temperature to the predetermined temperature of 800° C. at a heating rate of 5° C./min; stage 2: maintaining at the predetermined temperature of 800° C. for 3 hours; and stage 3: natural cooling with the furnace, to prepare the diamond carbon membrane on the stainless steel surface.

What is claimed is:

1. A method for preparing a diamond carbon membrane on a surface of stainless steel, comprising:
   (1) pretreatment of the surface of the stainless steel: the stainless steel surface is required to be subject to polishing, acid washing or electrochemical treatment for removal of oxide, grease stain, and grain impurities on the surface;
   (2) adhesion of a biomass-derived carbonaceous mesophase film on the stainless steel surface: the pretreated stainless steel is immersed into a solution of the biomass-derived carbonaceous mesophase in ethanol with a given concentration for 5 minutes prior to taking out and air drying; or alternatively, the solution of the biomass-derived carbonaceous mesophase in ethanol with a given concentration is sprayed onto the stainless steel surface, to provide a layer of biomass-derived carbonaceous mesophase film adhered on the stainless steel surface upon full volatilization of the solution on the surface; and
   (3) thermal treatment: the stainless steel having the biomass-derived carbonaceous mesophase film adhered is subject to thermal treatment under hydrogen-contained atmosphere, to prepare the diamond carbon membrane on the stainless steel surface.

2. The method for preparing a diamond carbon membrane on a surface of stainless steel according to claim 1, wherein the stainless steel is stainless steel 201, stainless steel 202, stainless steel 304, stainless steel 316, stainless steel 410 or stainless steel 420.

3. The method for preparing a diamond carbon membrane on a surface of stainless steel according to claim 1, wherein the solution of the biomass-derived carbonaceous mesophase in ethanol is one formulated from the biomass-derived carbonaceous mesophase by dissolution into absolute ethanol.

4. The method for preparing a diamond carbon membrane on a surface of stainless steel according to claim 1, wherein the solution of the biomass-derived carbonaceous mesophase in ethanol has a concentration of 0.0001-1 wt % of biomass-derived carbonaceous mesophase.

5. The method for preparing a diamond carbon membrane on a surface of stainless steel according to claim 1, wherein full impregnation of the stainless steel by the solution is required during immersion of the stainless steel in the solution of the biomass-derived carbonaceous mesophase in ethanol or spraying of the solution of the biomass-derived carbonaceous mesophase in ethanol onto the stainless steel surface.

6. The method for preparing a diamond carbon membrane on a surface of stainless steel according to claim 1, wherein the heat treatment process is divided into three stages: stage 1: heating from room temperature to the predetermined temperature of 800-1200° C. at a heating rate of 5-30° C/min; stage 2: maintaining at the predetermined temperature of 800-1200° C. for 0.5-3 hours; and stage 3: natural cooling with a furnace.

7. The method for preparing a diamond carbon membrane on a surface of stainless steel according to claim 1, wherein the hydrogen-contained atmosphere is pure hydrogen gas, or mixed gas of hydrogen gas and nitrogen gas or another inert gas.

8. The method for preparing a diamond carbon membrane on a surface of stainless steel according to claim 7, wherein another inert gas comprises helium gas or argon gas, and the percent by volume of the hydrogen gas is more than 75%.

* * * * *